Figure 1:
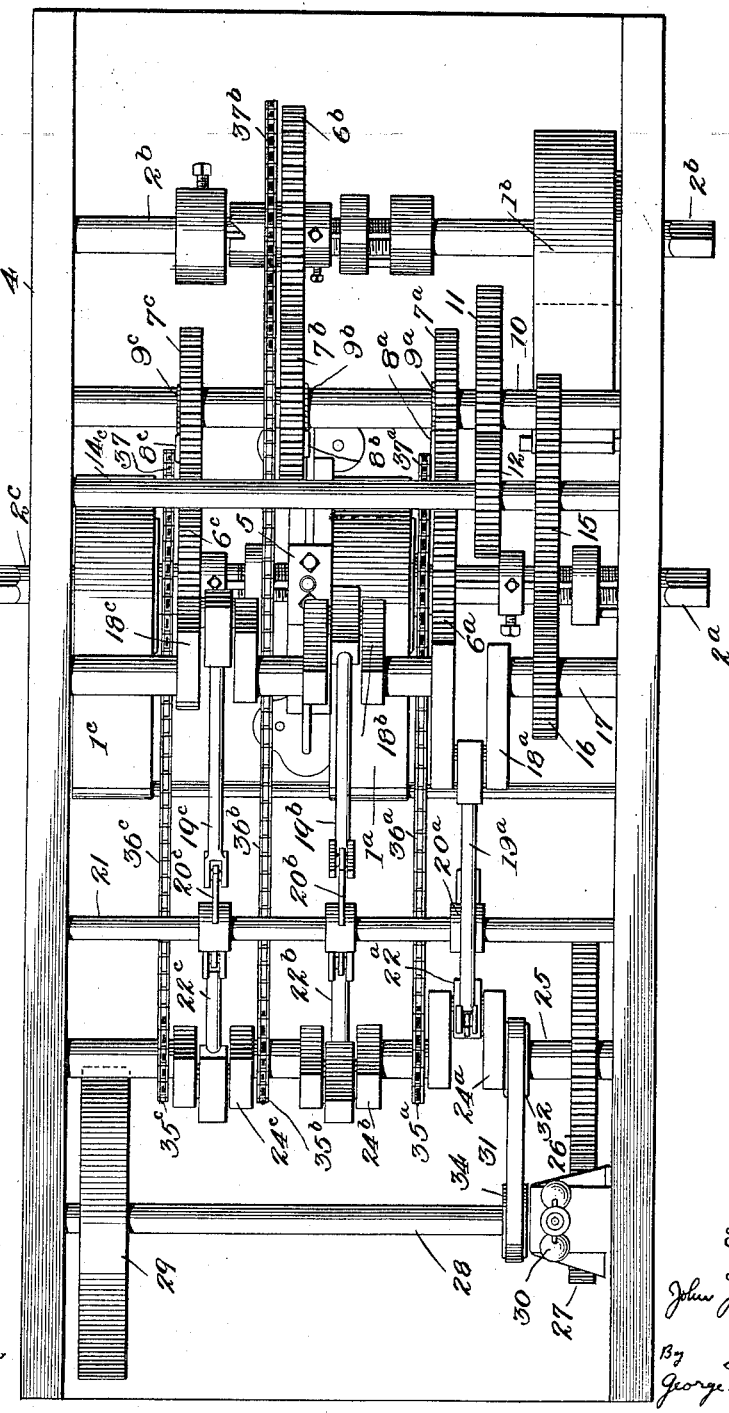

J. J. KIME.
PRIME MOVER.
APPLICATION FILED APR. 30, 1912.

1,033,418.

Patented July 23, 1912.
2 SHEETS—SHEET 1.

Witnesses

Inventor
John J. Kime
By
George W. Ramsey
Attorney

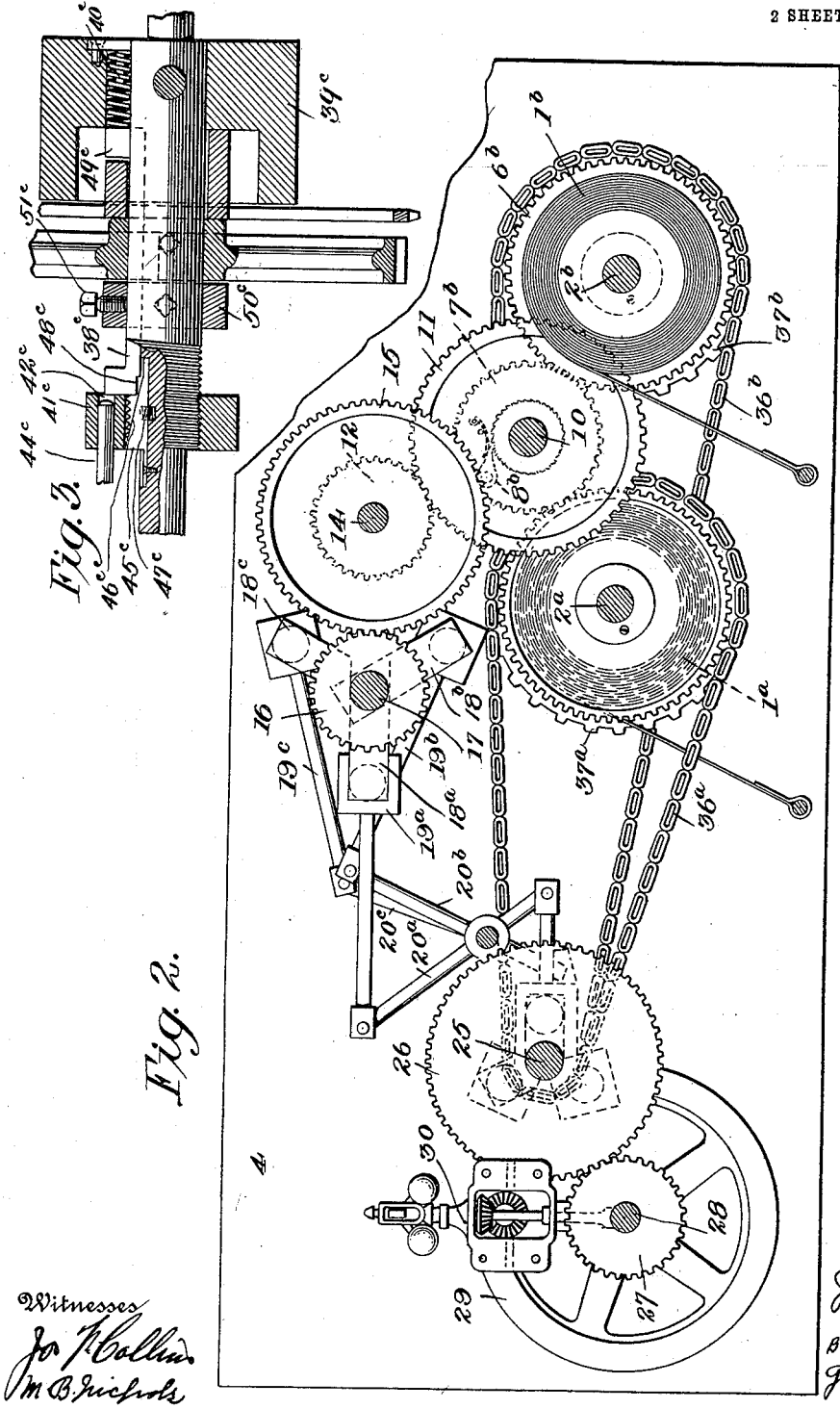

UNITED STATES PATENT OFFICE.

JOHN J. KIME, OF KENDALLVILLE, INDIANA.

PRIME MOVER.

1,033,418.  Specification of Letters Patent. Patented July 23, 1912.

Application filed April 30, 1912. Serial No. 694,129.

*To all whom it may concern:*

Be it known that I, JOHN J. KIME, a citizen of the United States, and a resident of Kendallville, county of Noble, State of Indiana, have invented certain new and useful Improvements in Prime Movers, of which the following is a specification.

This invention relates broadly to prime movers and specifically to a spring motor.

The principal object of this invention is to provide a spring motor comprising a plurality of springs in multiples of three wherein mechanism is provided in such manner that during the unwinding of certain of said springs other of the springs are being wound up, and during the operation of winding and unwinding a certain portion of the power of the driving spring is utilized in running a driven shaft.

Another object of this invention is to provide a spring driven mechanism wherein certain springs are arranged as driving springs and are adapted to operate a driving shaft and simultaneously wind other springs which may in turn become driving springs when they are wound to a predetermined extent.

A further object of this invention is to provide a mechanism wherein the driving force from a fully wound spring, or springs, may be partially utilized in re-winding certain other springs, and partially utilized in driving certain mechanism whereby the power of said springs is distributed by being transformed from one source to another source and driving energy given out during the period of transference between the said sources.

Other and further objects of this invention will in part be obvious and will in part be pointed out in the specification hereinafter following by reference to the accompanying drawings in which like numerals represent like parts throughout the several figures thereof.

Figure 1 is a plan view of the device. Fig. 2 is a detail showing a portion of the mechanism in elevation. Fig. 3 is a specific detail of the rewinding mechanism.

In motor driven mechanisms it is common to utilize a spring or a series of springs to drive a rotating member by permitting the springs to expend their force immediately and directly in rotating the driven member. In such a type of mechanism, particularly mechanisms wherein a constant motion is desired, such as in driving a turn table for a talking machine, etc., it is necessary that the speed of the mechanism be controlled by a friction brake governor. In devices of this character it is difficult to secure a friction brake governor that will give a uniform speed as a result of the actuation of the governor, for the reason the spring when fully wound exerts a very much greater driving force than when partially wound.

In the invention which will be more specifically described hereinafter, the driving springs are so arranged that while certain springs are driving, a certain spring or springs are being wound, and during this operation a portion of the power from the driving springs is used in rotating the driven shaft. Thus it will be noted that as the power is being transferred from one spring to the other, only a portion of that power is being utilized in driving, consequently the requirements upon the friction governor are not so great as if all of the power were immediately utilized in driving the driven shaft. The power which is being stored in winding, in turn is eventually utilized for driving, consequently it may be noted that applicant's device may be likened to a series of reservoirs of different levels wherein water may be run from one reservoir to another, and the flow of water intermediate the reservoirs be used for the purpose of developing power.

Referring now to the drawings and more particularly to Fig. 1, driving springs $1^a$ $1^b$ and $1^c$ are mounted upon winding shafts $2^a$ $2^b$ and $2^c$. The winding shaft $2^b$ is mounted to rotate in a frame 4, and the winding shafts $2^a$ and $2^c$ are mounted to rotate in the frame 4 and a journal bracket 5, that is, each of the shafts terminate at their inner ends within the journal bracket 5 which forms a support for the inner ends of the said shafts $2^a$ and $2^c$ respectively. Major driving gears $6^a$ $6^b$ and $6^c$ have a fixed and positive rotation with these shafts. The major driving gears are preferably constructed with seventy-eight teeth in each gear. (The number of teeth indicated in the driving gears in the drawings is merely arbitrary and consequently may or may not correspond to the number of teeth which I will indicate as being the preferred number.) These major driving gears 6ª 6ᵇ and 6ᶜ mesh respectively with ratchet gears 7ª 7ᵇ and 7ᶜ, each of which ratchet gears carry pawls 8ª 8ᵇ and 8ᶜ which are spring pressed into engagement with ratchets 9ª 9ᵇ and 9ᶜ that are fixedly mounted upon an intermediate shaft 10 which is journaled to rotate in the frame 4. The ratchet gears 7ª 7ᵇ and 7ᶜ are preferably constructed with forty-eight teeth. An intermediate gear 11 is fixedly mounted upon the said intermediate shaft 10 and is preferably provided with seventy-six teeth. This gear is adapted to mesh with a small transmission gear 12 fixedly mounted upon a transmission shaft 14 and preferably provided with thirty-eight teeth. A large transmission gear 15 is also fixedly mounted upon the transmission shaft 14 and is preferably provided with seventy-six teeth. The large transmission gear 15 is adapted to mesh with a driven gear 16 fixedly mounted upon a crank shaft 17 and is preferably provided with thirty-eight teeth. The crank shaft 17 is mounted to rotate in journals provided in the frame 4, and is provided with driving cranks 18ª 18ᵇ and 18ᶜ which are set at angular distances of one hundred and twenty degrees apart. Each of the driving cranks 18ª 18ᵇ and 18ᶜ are connected by means of upper links 19ª 19ᵇ and 19ᶜ with reduction levers 20ª 20ᵇ and 20ᶜ respectively. The reduction levers comprise levers of the first class having lever arms whose lengths are in the proportion two to one, and are mounted to oscillate upon a shaft 21 which is fixed in the frame 4, and are connected at their lower ends by means of lower links 22ª 22ᵇ and 22ᶜ respectively, with driven cranks 24ª 24ᵇ and 24ᶜ that are formed upon a driven crank shaft 25. The driven cranks 24ª 24ᵇ and 24ᶜ are shown at angular distances of substantially one hundred and twenty degrees apart. A large power gear 26 is fixedly mounted upon the driven crank shaft 25 and is constructed to mesh with a small power gear 27 that is attached to the power shaft 28, which shaft is mounted for rotation in the frame 4 and carries a fly wheel 29. A friction governing mechanism 30 is mounted adjacent the power shaft 28, and is arranged in such manner as to regulate the speed of the power shaft by applying or releasing a friction brake mechanism, as is well known and common in the art. The friction governor in the present instance is shown as being driven by means of a belt 31 which is carried upon belt wheels 32 and 34 carried upon the driven crank shaft 25 and the power shaft 28 respectively. The driven crank shaft 25 is also provided with sprocket wheels 35ª 35ᵇ and 35ᶜ, preferably constructed with eight teeth, and each of the sprocket wheels is adapted to carry sprocket chains 36ª 36ᵇ and 36ᶜ, which chains lead to large sprocket wheels 37ª 37ᵇ and 37ᶜ that are preferably constructed with twenty-six teeth, and which form a part of the winding mechanism which will now be more specifically described.

Referring more particularly to Fig. 3, the winding shaft 2ᶜ carries fixedly mounted thereupon the major driving gear 6ᶜ, adjacent to which is loosely mounted the large sprocket wheel 37ᶜ. The large sprocket wheel hub is provided with a locking notch similar to the locking notch clearly shown in the hub of the sprocket wheel 37ᵇ. The winding shaft 2ᶜ is provided with a longitudinal groove in which is adapted to move a locking plunger 38ᶜ. A hub member 39ᶜ is fixedly mounted upon the winding shaft 2ᶜ and carries a coiled spring 40ᶜ which normally tends to force the locking plunger into the locking notch on the hub of the large sprocket wheel 37ᶜ. The inner end of the winding shaft 2ᶜ is screw threaded and is adapted to carry a controller collar 41ᶜ which is provided with an opening 42ᶜ in which a stationary pin 44ᶜ is adapted to have a longitudinal movement. As the winding shaft 2ᶜ is rotated the controller collar 41ᶜ is moved longitudinally upon the shaft, by means of the screw threads, in a direction dependent upon the direction of rotation of the winding shaft. A locking latch 45ᶜ is also mounted upon the winding shaft 2ᶜ and is provided with an inclined cam face 46ᶜ, which is normally spring pressed into engagement with the controller collar 41ᶜ, by means of a small coiled spring 47ᶜ. The inner end of the locking plunger 38ᶜ is provided with a latch notch 48ᶜ which is adapted to coöperate with the latching face of the locking latch 46ᶜ when the locking plunger has been moved longitudinally against the force of the coiled spring 40ᶜ to a distance sufficient to remove the locking head 49ᶜ from engagement with the locking notch in the hub of the large sprocket wheel 37ᶜ. The winding shaft 2ᶜ is also provided with a retaining collar 50ᶜ which carries a small set screw 51ᶜ that is adapted to bear upon the locking plunger and obviate any danger of the plunger buckling upward out of its guiding groove.

During the operation of the mechanism which has been specifically described, presuming the driving spring 1ª to be fully wound, the driving spring 1ᵇ to be one-half unwound, and the driving spring 1ᶜ entirely unwound, the locking plungers 38ª and 38ᵇ will be held disengaged from the locking notches in the hubs of the large sprocket wheels 37ª and 37ᵇ, by means of their respective latch members 45ᶜ being in engagement with the latch notches 48ᶜ. The locking plunger 38ᶜ however, will be in engagement with the notch in the hub of the large sprocket wheel 37ᶜ for the reason the controller collar will have moved to the position shown in Fig. 3, thus releasing the locking plunger 38ᶜ and permitting it to be seated in the notch in the hub of the sprocket wheel 37ᶜ, by means of the coiled spring 40ᶜ. With this condition existing it will be noted that the train of mechanism is so arranged that the driving springs 1ᵃ and 1ᵇ are operating to transmit their energy to the driven crank shaft 25, and that this shaft through the small sprocket wheel 35ᶜ, the sprocket chain 36ᶜ and the large sprocket wheel 37ᶜ, which is now clutched to the winding shaft 2ᶜ by means of the locking plunger 38ᶜ, is rewinding the spring 2ᶜ. The re-winding operation will continue until the controller collar 41ᶜ has moved the locking plunger 38ᶜ a sufficient distance against the pressure of the coiled spring 40ᶜ to release the locking head 49ᶜ from the notch in the hub of the sprocket wheel 37ᶜ. During the re-winding operation the ratchet gear 7ᶜ turns loosely upon the intermediate shaft 10, and the pawl 8ᶜ rides away from the locking faces and over the tops of the teeth in the ratchet 9ᶜ. Immediately as the driving spring 1ᶜ is wound to a pre-determined extent, the controller collar 40ᵃ on the winding shaft 2ᵃ will have moved a sufficient distance to release its respective locking latch 45ᵃ thus permitting the sprocket wheel 37ᵃ to be locked to the winding shaft in the manner hereinbefore specifically described with reference to the mechanism attendant upon the winding of spring 1ᶜ. The wound spring 1ᶜ now becomes a driving spring and begins to wind the spring 1ᵃ. Thus the energy is transferred from one spring to another until all of the springs shall have reached a condition wherein it becomes necessary to rewind certain of the springs by extraneous power.

It is to be understood of course, that the controller collars 41ᵃ 41ᵇ and 41ᶜ are so arranged as to cause the re-winding and unwinding operation of the springs to take place according to pre-determined intervals throughout the entire series of springs, in the manner I have specified. It is also to be understood that the invention hereinbefore set forth may be carried out by a construction involving gears having more or less teeth than those which have been specifically specified. Hence, I desire it to be understood that the mechanism specifically shown and described shall be considered as illustrative of my invention and not be considered in a limiting sense.

Having thus described my invention what I desire to claim is:—

1. In a device of the class described in combination, a driving spring, a driving crank, multiplying gears between said driving spring and said driving crank, a driven crank, a reduction lever, a link operatively connecting one end of said reduction lever with the driving crank, and a link operatively connecting the other end of said reduction lever with the driven crank.

2. In a device of the class described in combination, a plurality of driving springs, a driving crank shaft provided with a plurality of driving cranks, trains of multiplying gearing connecting said driving springs with said driving crank shaft, a plurality of reduction levers, connecting means between each of said reduction levers and each driving crank, a driven crank shaft provided with a plurality of cranks, and connecting means between each of said reduction levers and said driven cranks.

3. In combination, three driving springs, a driving crank shaft provided with three driving cranks, multiplying gears between each driving spring and said driving crank shaft, three reduction levers, links operatively connecting each reduction lever with each driving crank, a driven crank shaft provided with three driven cranks, and connecting links operatively connecting the driven cranks with said reduction levers, the path of said driving cranks being of a greater circumference than the path of said driven cranks.

4. In a device of the class described in combination, a plurality of springs, a driven shaft, multiplying gear mechanism constructed to operatively connect certain of said springs with said driven shaft in such manner as to drive said shaft, a re-winding mechanism for each of said springs, and means constructed to render said re-winding mechanism inoperative when any one of said springs has been wound to a pre-determined extent.

5. In a device of the class described in combination, a plurality of springs, a driven shaft, gear mechanism arranged to operatively connect said springs with said driven shaft, a re-winding mechanism operated by said driven shaft, said re-winding mechanism including a shaft, a screw threaded collar mounted upon said shaft, a hub adapted to support a helical spring, a sprocket wheel loosely mounted upon said shaft, and a longitudinally movable plunger latch, a spring for normally pressing said plunger into engagement with a locking notch upon said sprocket wheel, and a latch member under control of said screw threaded collar adapted to normally retain said plunger in disengagement from said notch.

6. In a device of the class described in combination, a plurality of driving springs, a single driving crank shaft, multiplying gearing mechanism intermediate said driving springs and said driving crank shaft, said driving crank shaft being provided with as many driving cranks as there are driving springs, a reduction lever for each driving crank, a link connection between each driving crank and each reduction lever, a driven crank shaft provided with as many driven cranks as there are driving springs, a connection between each driven crank and each reduction lever, and a friction governing mechanism for controlling the speed of said driven crank shaft.

JOHN J. KIME.

Witnesses:
 A. G. HILL,
 CHARLES REED.

Copies of this patent may be obtained for five cents each, by addressing the "Commissioner of Patents, Washington, D. C."